(12) United States Patent
Chen et al.

(10) Patent No.: US 7,077,530 B2
(45) Date of Patent: Jul. 18, 2006

(54) PROJECTOR OF EXTERNAL POWER SUPPLY

(75) Inventors: Chi-Jen Chen, TaoYuan (TW); Shih-Pin Chen, TaoYuan (TW); Chi-Hong Chen, TaoYuan (TW)

(73) Assignee: Benq Corporation, Taoyuan (TW)

( * ) Notice: Subject to any disclaimer, the term of this patent is extended or adjusted under 35 U.S.C. 154(b) by 221 days.

(21) Appl. No.: 10/739,330

(22) Filed: Dec. 19, 2003

(65) Prior Publication Data

US 2004/0130687 A1  Jul. 8, 2004

(30) Foreign Application Priority Data

Dec. 20, 2002  (TW) .............................. 91220769 U

(51) Int. Cl.
*G03B 21/00* (2006.01)
*H05B 37/02* (2006.01)

(52) U.S. Cl. ...................... 353/122; 315/224; 315/308; 315/225; 315/307

(58) Field of Classification Search ........ 315/307–308, 315/224, 362, 225, 209 R, 360, 291, 276, 315/247; 353/122
See application file for complete search history.

(56) References Cited

U.S. PATENT DOCUMENTS

| | | | | |
|---|---|---|---|---|
| 5,463,287 A | * | 10/1995 | Kurihara et al. | 315/307 |
| 5,990,633 A | * | 11/1999 | Hirschmann et al. | 315/289 |
| 6,208,088 B1 | * | 3/2001 | Konishi et al. | 315/291 |
| 6,281,642 B1 | * | 8/2001 | Konishi et al. | 315/308 |
| 6,522,089 B1 | * | 2/2003 | Duong et al. | 315/308 |
| 6,693,393 B1 | * | 2/2004 | Konishi et al. | 315/224 |
| 6,861,812 B1 | * | 3/2005 | Kambara et al. | 315/291 |
| 6,864,642 B1 | * | 3/2005 | Nemirow et al. | 315/224 |

* cited by examiner

*Primary Examiner*—Wilson Lee
*Assistant Examiner*—Chuc Tran
(74) *Attorney, Agent, or Firm*—Birch, Stewart, Kolasch & Birch, LLP

(57) ABSTRACT

The invention is to provide a projector of external power supply, which comprises: a DC (direct current) power supply port, a step-up circuit, a voltage regulation circuit, a lamp, and an igniter. Wherein, a DC voltage provided from outside is received by the DC power supply port and is converted to a first electric potential by the step-up circuit. The first electric potential may actuate the igniter to light up the lamp and, after the lamp is lighted up, the step-up circuit regulates the working voltage of the lamp to a second potential voltage. Wherein, the first electric potential is higher than the second electric potential.

13 Claims, 5 Drawing Sheets

PROJECTOR OF EXTERNAL POWER SUPPLY

This Nonprovisional application claims priority under 35 U.S.C. §119(a) on Patent Application No(s). 091220769 filed in TAIWAN on Dec. 20, 2002, the entire contents of which are hereby incorporated by reference.

FIELD OF THE INVENTION

This invention is related to an projector of external power supply, wherein an external power supply outside the projector is provided to supply a DC power supply, and operates in coordination with a ballast circuit framework with step-up circuit that is set up inside the projector. Consequently, the objectives of moving the power supply to the outside and reducing the volume of projector are achieved.

BACKGROUND OF THE INVENTION

In a present day projector, a built-in AC/DC power converter is most prevailing. As shown in FIG. 1, power supply 11 and ballast 12 are set up inside the casing 10 of projector. The power supply 11 is connected to an external power cord 112 of the projector. The grid power of 110 VAC or 220 VAC is introduced to the power supply 11 by an external plug 111 and is converted to different voltages required by the projector through the circuit framework of the power supply 11 and the circuit framework of the ballast 12. Please refer to FIG. 2, which illustrates the circuit framework of the power supply 11 and the circuit framework of the ballast 12 according to the prior arts. The power supply 11 is a power factor refining circuit (PFC), by which the grid power of 110 VAC or 220 VAC can be transformed into a high voltage of 380 volts and thereafter output to both the ballast 12 and a sub-power circuit 13 which is required by the circuit board. The ballast 12 applies a step-down circuit to transform the 380 volts voltage into the voltage (about 80 volts) needed by the lamp 121. The sub-power circuit 13 applies a fly-back circuit framework to transform the 380 volts voltage into different voltages (such as: 12 volts, 5 volts, and 3.3 volts, etc.) needed by the circuit board, wherein a transformer T1 and an opto-coupler IC1 are needed by the sub-power circuit 13 to isolate the first side and the second side.

According to the national security test standard and the consideration of safety factor, an exposed voltage can not exceed 60 volts while the voltage generated in the power supply of a projector must reach 380 volts to light up the lamp. Therefore, this is the main reason why the power supply device must be built in a traditional projector. Because of the specific space occupied by power supply that is set up in the projector, the volume of the projector can not be reduced. Hence, to move the power supply out of the projector has become an arduous problem for current manufacturers.

SUMMARY OF THE INVENTION

In view of the shortcomings of the power supply according to the prior arts, the main objective of the present invention is to provide a projector of external power supply which can receive a DC voltage supplied from exterior, and operates in coordination with a ballast circuit framework with step-up circuit that is set up inside the projector. Hence, the objectives of moving the DC/AC converter out of the projector and reducing the volume of the projector can be achieved.

The secondary objective of the present invention is to provide a projector with external power supply that its refined circuit is also applicable to the other portable electrical apparatuses which a voltage step-up action are required in their interior.

For your esteemed member of reviewing committee to further recognize and understand the characteristics, objectives, and functions of the present invention, a detailed description together with corresponding drawings are presented thereinafter.

DETAILED DESCRIPTION OF THE INVENTION

Figure 1:
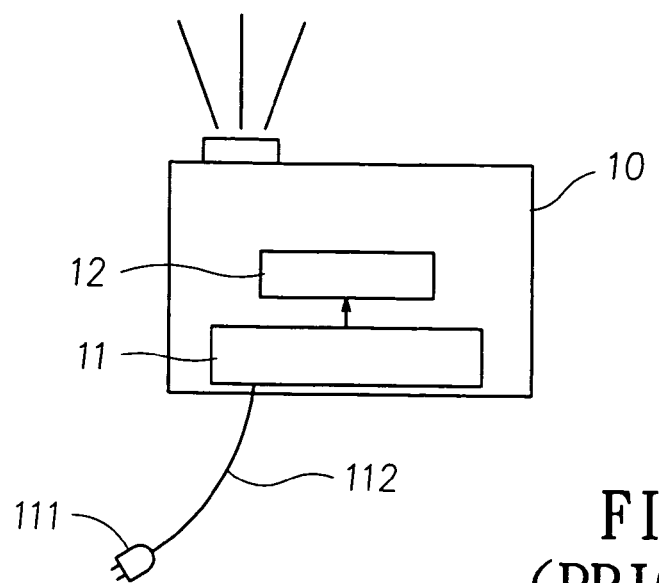
FIG. 1 is a schematic drawing illustrating a projector with built-in power supply according to the prior arts.
Figure 3:
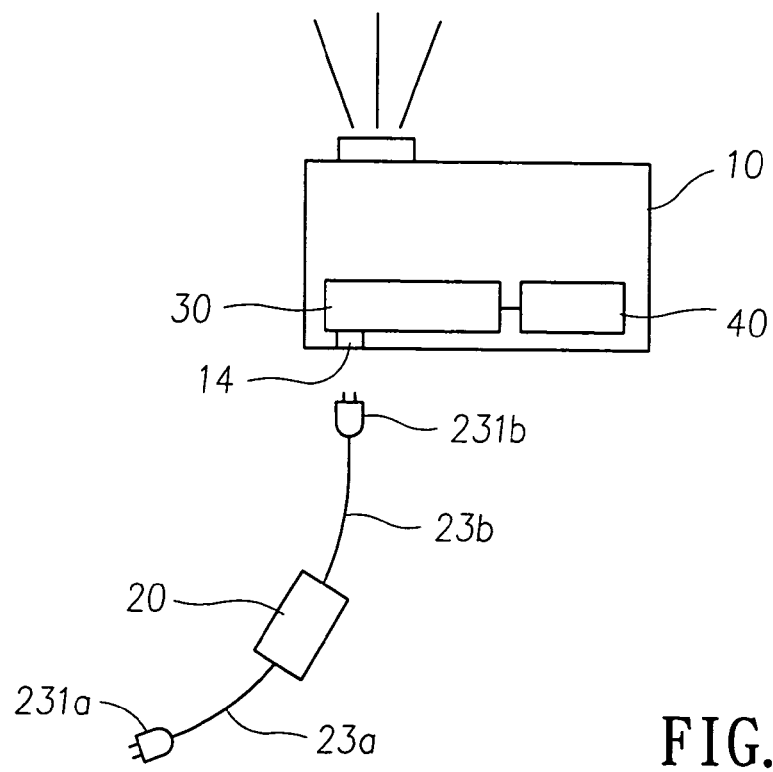
FIG. 3 is a schematic drawing illustrating a projector of external power supply according to the present invention.
Figure 2:
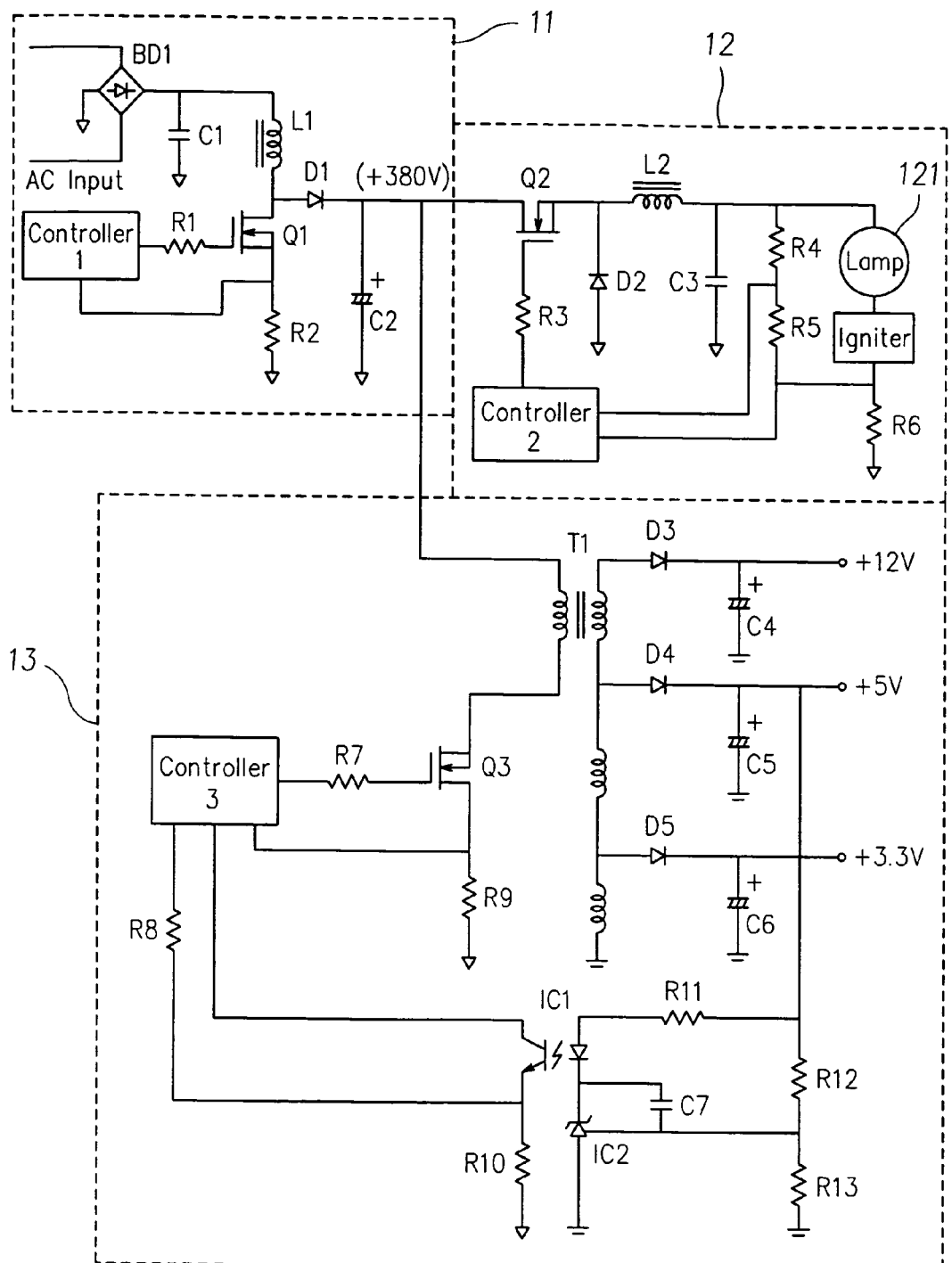
FIG. 2 is a circuit framework of a projector with built-in power supply according to the prior arts.

Referring now to FIG. 3, which is an projector with a voltage converter 20 setting up outside the casing 10 of the projector and a ballast circuit 30 setting up inside the casing 10 of the projector. The ballast circuit 30 is connected to a DC power supply port 14. A power supply cord 23a is set up at one side of the voltage converter that has a plug 231a connecting to the grid power (110/220 VAC). Moreover, a power supply cord 23b is set up at the other side of the voltage converter 20 that has a plug 231b connecting to the DC power supply port 14. Hence, the plug 231a and the power supply cord 23a introduce the grid power (110/220 VAC) into the voltage converter 20, by which the grid power (110/220 VAC) is converted to a DC voltage (48 VDC) needed by the projector. Moreover, the power supply cord 23b and the plug 231b send the DC voltage (48 VDC) into the ballast circuit 30 through the DC power supply port 14.

Figure 4:
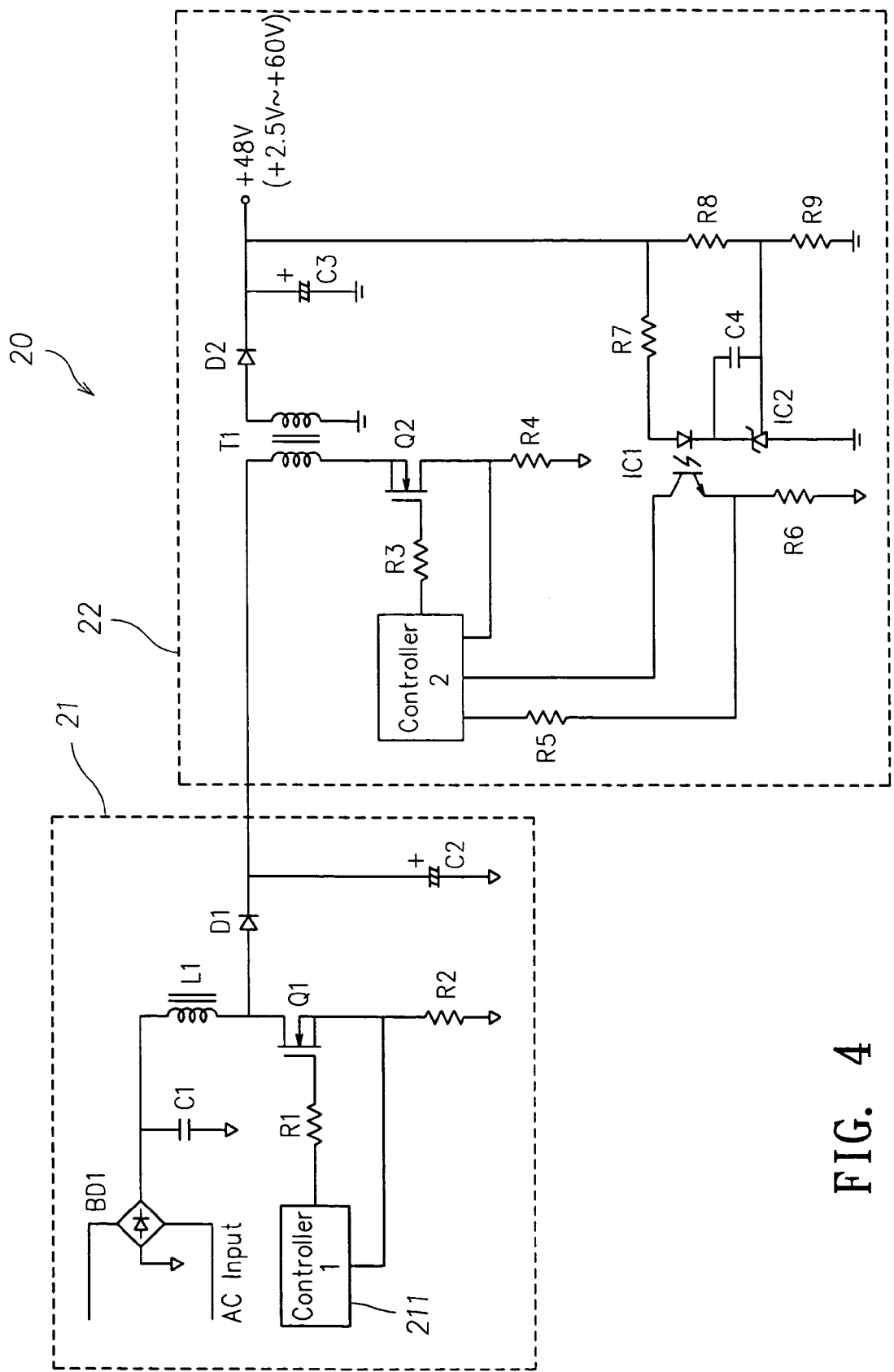
FIG. 4 is a circuit framework of the preferable external power supply embodiment according to the present invention.

Please refer to FIG. 4, which is a voltage converter 20 used by the projector of external power supply according to the present invention. The voltage converter 20 has a power factor refining circuit 21, by which the grid power of 110 volts or 220 volts is converted to 380 volts voltage. The high voltage of 380 volts then is converted to a low voltage ranging from 2.5 volts to 60 volts by a set of fly-back circuit 22. Taking the low voltage of 48 volts as an example with reference to FIG. 4, the fly-back circuit 22 employs transformer T1 and opto-coupler IC1 as a isolation of the first side and the second side. Therefore, since the output voltage is lower than 60 volts, the safety requirement can be fulfilled and there is no hazard for both the power supply cord and the connecting plug. However, the designing purpose of the above-mentioned voltage converter 20 is to ensure the voltage converter 20 is able to raise the voltage to 380 volts. When the specification of current and voltage is within the safe working range of the projector, a voltage converter that is commonly available in current market can be used to provide a DC power supply to the projector according to the present invention.

Figure 5:
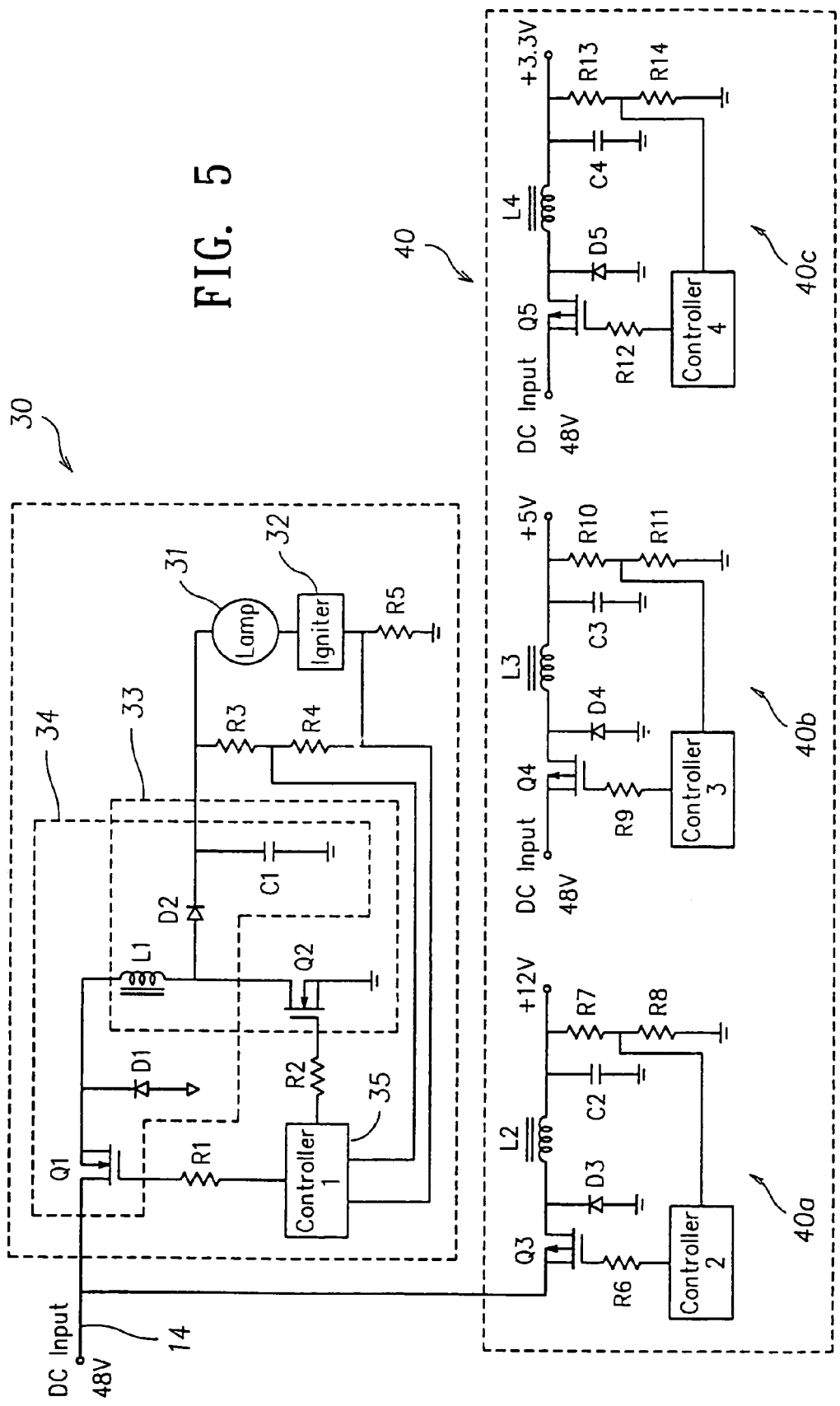
FIG. 5 is a circuit framework of the preferred ballast embodiment according to the present invention.

To cooperate with the projector of external power supply according to the present invention, a ballast circuit 30 with the functions of step-up and step-down circuits is set up inside the projector. As shown in FIG. 5, the ballast circuit 30 is connected to DC power supply port 14 for receiving a DC voltage of 48 volts supplied from exterior. At the beginning stage of lighting-up the lamp, the transistor Q1 is completely conducted (same as a switch), and the step-up circuit 33 that is constituted by an inductance L1, a transistor Q2, a diode D2, and a capacitance C1 can raise the voltage to a first voltage which is slightly higher than 200 volts. 250 volts is used in the present invention as an example. Thereafter, an igniter 32 generates a transient high voltage to light up the lamp 31. After the lamp 31 is lighted up, the transistor Q2 is closed completely. The voltage is step-down by a step-down circuit 34 formed by the transistor Q1, the diode D1, the inductance L1, the diode D2, the capacitance C1, and feedback controller 35 to provide a voltage of 20 volts to the lamp 31. The lamp 31 and the feedback controller 35 control the output wattage of the ballast circuit 30 to be raised gradually. The feedback controller 35 is connected to a detecting resistance R5, of which the voltage is based to regulate the output wattage; The detecting resistance R5 is connected in series to the lamp 31 and its another end is grounded, so that the voltage over this detecting resistance R5 is proportional to the current passing through the lamp 31. The feedback controller 35 can regulate the voltage of the lamp according to this voltage until the transistor Q1 is opened completely. At this time, the step-up circuit 33 constituted by the inductance L1, the transistor Q2, the diode D2, and the capacitance C1 raises the voltage to a voltage and wattage needed by the lamp 31 to complete the lighting-up procedure; Please refer to FIG. 5, in which three sets of step-down circuit 40a, 40b, 40c are respectively operated in cooperation with the ballast circuit 30 to directly convert the input voltage of 48 volts to three different voltages of 12 volts, 5 volts, and 3.3 volts that are needed by the circuit board. This is a so-called DC-DC converter 40. Since the step-down circuits 40a, 40b, 40c are all located at second side and are all in low voltages, there is no safety distance precaution and it is easy to miniaturize.

Figure 6:
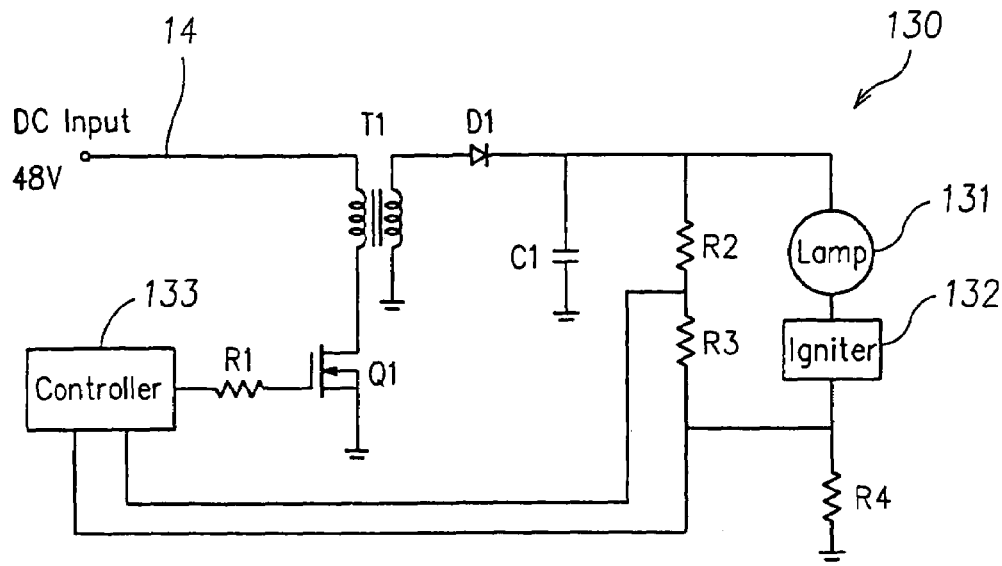
FIG. 6 is a circuit framework of the fly-back circuit adapted by the ballast according to the invention.

A fly-back circuit can also replace the ballast circuit 30 of FIG. 5. Please refer to FIG. 6, which is a circuit framework of the fly-back circuit 130. Similarly, the flying-back circuit 130 is connected to a DC power supply port 14 for receiving a DC voltage of 48 volts supplied from the exterior. The fly-back circuit 130 includes a field effect transistor Q1, a transformer T1, a capacitance C1, and a feedback controller 133. The transistor Q1 is a field effect transistor switch that includes: a source, a drain, and a gate, wherein the source is connected to the transformer T1, the gate is connected to the feedback controller 133, and the drain is grounded. When the transistor Q1 is opened, the energy can be stored in the transformer T1. When the transistor Q1 is closed, the transformer T1 then releases the energy to the capacitance C1 through the diode D1. At the beginning stage of lighting-up the lamp, the transformer T1 can raise the voltage of the capacitance C1 to 250 volts (i.e., the voltage of the lamp is 250 volts). Thereafter, the igniter 132 generates a high voltage to light up the lamp 131. After the lamp 131 is lighted up, the transformer T1 lower the voltage of the capacitance C1 to about 20 volts (i.e., the voltage of the lamp 131 is 20 volts) and then the current of the lamp 131 will decrease gradually through time. The transformer T1 can gradually increased the voltage of the capacitance C1 by employing the feedback of the feedback controller 133. The feedback controller 133 is connected to a detecting resistance R4, of which the voltage is based to regulate the output wattage; The detecting resistance R4 is connected in series to the lamp 131, and its another end is grounded. Hence, the voltage over the detecting resistance R4 is proportional to the current passing through the lamp 131. The feedback controller 35 can regulate the voltage of the lamp according to this voltage, and the output wattage also increases gradually to the normal rated value of the lamp 131; The method for the feedback controller 133 to regulate the voltage of the lamp 131 is by controlling the period of open and close of Q1 to control the charging/discharging time of C1, so as to regulate the voltage of the lamp 131; Resistances R2, R3 are feedback resistances of the lamp voltage, and resistance R4 is the sensing resistance of the lamp current. Similarly, the fly-back circuit 130 can operate in cooperation with the DC-DC converter 40 of FIG. 5 to respectively convert the input voltage of 48 volts into three different voltages of 12 volts, 5 volts, 3.3 volts that are needed by the circuit board.

Figure 7:
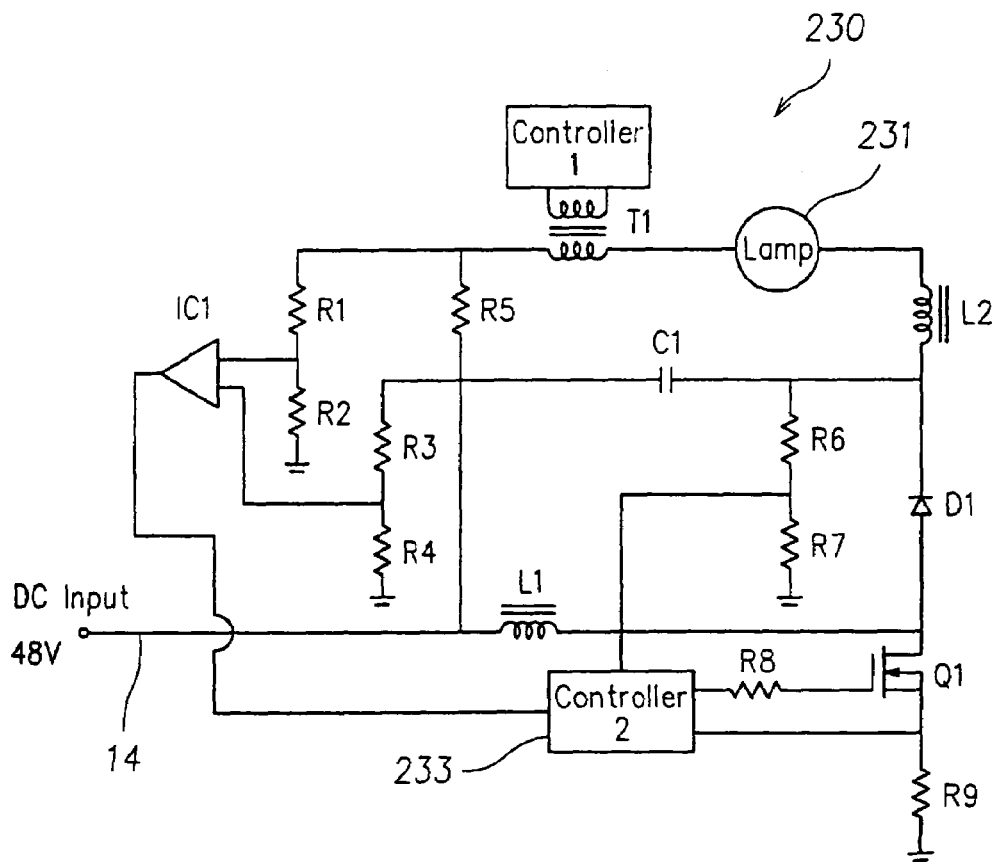
FIG. 7 is a circuit framework of ballast with step-up circuit according to the present invention.

A step-up/step-down circuit can also replace the ballast circuit 30 of FIG. 5. Please refer to FIG. 7, which is a circuit framework of a step-up/step-down circuit 230. The circuit can be employed for stepping up voltage and also for stepping down voltage. Similarly, the step-down circuit 230 is connected to the DC power supply port 14 for receiving the DC voltage of 48 volts supplied from the exterior. When the transistor Q1 is opened, the energy is stored in the inductance L1. When the transistor Q1 is closed, the inductance L1 releases the energy to the capacitance C1 through the diode D1. To regulate the voltage of the capacitance C1 can be accomplished simply by control the duty cycle of the transistor Q1 using the controller 233. The output voltage range of the capacitance C1 is about 10 to 150 volts. The voltage of the capacitance C1 reaches the lamp 231 through the inductance L2 then, through the transformer T1, resistance R5, and goes back to capacitance C1. The operation of the transformer T1 is equivalent to the igniters 32, 132 of FIG. 5 and FIG. 6. At the beginning stage of lighting up the lamp, the transformer T1 can supply a high voltage to the lamp 231 to light up the lamp 231; The resistance R5 is a current sensing resistance, which is used to feed back the current of the lamp 231. The feedback is amplified by the opto-coupler IC1 and is then sent to the controller 233 to control the current of the lamp 231. Resistances R6, R7 are the feedbacks of the voltage of the capacitance C1 which are used to control the voltage of the capacitance C1. Since the internal resistances of the inductance L2, the transformer T1, and resistance R5 are very low, the voltage of the capacitance C1 is approximately equal to the voltage of the lamp 231. And the above-mentioned to control the voltage and current of the lamp 231 are equivalent to control the wattage of the lamp 231. Equally, the step-down circuit 230 can operate in cooperation with the DC-DC converter 40 of FIG. 5 to respectively convert the input voltage of 48 volts into three different voltages of 12 volts, 5 volts, 3.3 volts that are needed by the circuit board.

It is noted that the lighting-up voltage needed by the lamp of the traditional projector with built-in power supply is about 380 VAC. After the power supply and the ballast circuit framework are improved according to the present invention, a low input voltage is stepped up to 380 volts to light up the lamp, then the high voltage is stepped down to a low voltage to provide current to the lamp and, after a short period of time, the voltage is again stepped up to the working voltage of the lamp. Yet, there is no serious influence to the brightness effect of the lamp. Namely, Fulfilling the requirement to miniaturize the volume of projector, the present invention indeed has an obvious improvement, as to enhance the portable convenience for carrying a projector. Furthermore, although the circuit framework of the above-mentioned step-up circuit operates in cooperation with the circuit of the adjustable voltage circuit capable of stepping down is a technique of the prior arts, this technique is never employed in ballast circuit. The present invention applies the step-up/step-down circuits in the ballast to give a new usage to the step-up/step-down circuits. At the same time that the objective for reducing the volume of a projector can be achieved and the arduous problem for traditional manufacturers of projector can be overcome. Moreover, the circuit framework constituted by the cooperation between the external power supply and the ballast not only can be employed in a projector, but also can be applied to other electronic apparatuses driven by high voltage. In other words, this circuit framework may effectively reduce the volumes of such kinds of electronic apparatuses to achieve the objective of portable convenience. Since this kind of technique is an adaptation of the same technique, therefore no repetitious description is presented herein.

In summary, a projector of external power supply according to the present invention is depicted illustrating by employing a power factor refining circuit and a fly-back circuit to construct a circuit framework of power supply which operates in cooperation with a ballast circuit framework with step-up circuit that is set up inside the projector, so as to achieve the objectives for moving its power supply to the outside and reducing its volume. Consequently, the invention should obviously possess the applicability and the progressiveness for industry. However, the description and the drawings disclosed hereinbefore are only applied as preferred embodiments according to the present invention and can not be used to restrict the range of its actual implementation. Therefore, any variation of the structural characteristics and of functions according to the above description and the writings of the following claims, e.g. the change of value and the replacement of equivalent devices, are all within the field of the present invention.

What is claimed is:

1. A projector of external power supply, the projector comprising:
    a DC power supply port, providing for receiving a DC voltage from the outside of said projector;
    a step-up circuit, including:
        an inductance, of which one end is connected to said DC power supply;
        a field effect transistor;
        a diode, of which one end is connected to said inductance and said field effect transistor; and
        a capacitance, of which one end is connected to said diode, and of which another end is grounded;
    a voltage regulation circuit;
    a lamp; and
    an igniter;
    said step-up circuit converts the DC voltage to a first electric potential, said first electric potential may actuate said igniter to light up said lamp and, after said lamp is lighted up, said step-up circuit regulates the working voltage of said lamp to a second potential voltage, said first electric potential being higher than said second electric potential;
    wherein when the projector is actuated, said DC voltage charges said inductance and said capacitance; after the voltage over said capacitance is equal to said first voltage, said igniter is actuated to generate a transient high voltage to light up said lamp.

2. The projector of external power supply of claim 1, wherein said projector comprises at least one set of DC-DC converter, and wherein said DC voltage is transformed corresponding to said at least one set of said DC-DC converter to at least one set of low voltage.

3. The projector of external power supply of claim 2, wherein operates in cooperation with three set of said DC-DC converter to respectively convert the input voltage into three different voltages of 12 volts, 5 volts, 3.3 volts.

4. The projector of external power supply of claim 1, wherein said field effect transistor is closed completely after said lamp is lighted up.

5. The projector of external power supply of claim 1, wherein said voltage regulation circuit comprises a feedback controller, which regulates the working voltage of said lamp according to the measure of current passing through said lamp after said lamp is lighted up.

6. The projector of external power supply of claim 5, wherein said projector comprises a detecting resistance, which is connected in series to said lamp, and of which one end is electrically connected to said feedback controller, and of which another end is grounded, and wherein said feedback controller decides the measure of current passing through said lamp according to the voltage over said detecting resistance.

7. A projector of external power supply, said projector comprising:
    a DC power supply port, providing for receiving a DC voltage from the outside of said projector;
    a step-down circuit, which comprises a switch, a capacitance, a feedback controller, and a transformer, of one end of the first side of said transformer being connected to said DC power source port, and of another end of said first side of said transformer connected to the switch, and one end of a second side of said transformer being connected to a first end of said capacitance, a second end of said capacitance being grounded;
    a lamp; and
    a igniter;
    when the projector is actuated, said switch is opened and said transformer is charged by said DC voltage to raise the voltage over said capacitance to a first potential, and wherein said first potential raised to a point that actuates said igniter to light up said lamp enables said switch to close, and wherein said feedback controller regulate the working voltage of said lamp to a second potential, and wherein said first potential voltage is higher than said second potential voltage.

8. The projector of external power supply of claim 7, wherein said DC voltage is transformed corresponding to at least one set of DC-DC converter to at least one set of low voltage.

9. The projector of external power supply of claim 8, wherein operates in cooperation with three set of said DC-DC converter to respectively convert the input voltage into three different voltages of 12 volts, 5 volts, 3.3 volts.

10. The projector of external power supply of claim 7, wherein said feedback controller regulates said second potential by controlling the period of open and close of said switch.

11. The projector of external power supply of claim 7, wherein said switch is a field effect transistor switch, which includes: a source, a drain, and a gate, and wherein said source is connected to said transformer, said gate is connected to said feedback controller, and said drain is grounded.

12. A projector of external power supply said projector comprising:
   a DC power supply port, providing for receiving a DC voltage from the outside of said projector;
   a step-down circuit which comprises a first inductor, a switch, a feedback controller, a capacitance and a second inductor, one end of said first inductor being connected to said DC power supply port and a second end which is connected to a common point between one terminal of said switch, one side of said capacitance and one end of said second inductance;
   a lamp;
   when the projector is actuated, said switch is opened and energy is stored in the first inductance, when the transistor is closed, the first inductance releases energy to the capacitance, the voltage of the capacitance lights up said lamp; and
   wherein a feedback controller regulates the working voltage of said lamp according to the measure of current passing through said lamp after said lamp is lighted up.

13. The projector of external power supply of claim 12, further comprising a detecting resistance, which is connected in series to said lamp wherein said feedback controller decides the measure of current passing through said lamp according to the voltage over said detecting resistance.

* * * * *